United States Patent [19]

Merz

[11] 4,380,272
[45] Apr. 19, 1983

[54] OIL RESERVOIR PARTICULARLY FOR HYDRAULIC STEERING SYSTEM

[75] Inventor: Johann Merz, Bopfingen, Fed. Rep. of Germany

[73] Assignee: Zahnradfabrik Friedrichshafen AG, Friedrichshafen, Fed. Rep. of Germany

[21] Appl. No.: 145,796

[22] Filed: May 1, 1980

[30] Foreign Application Priority Data

May 19, 1979 [DE] Fed. Rep. of Germany ....... 2920321

[51] Int. Cl.³ ............................................. B62D 5/06
[52] U.S. Cl. ................................... 180/132; 137/351; 137/355
[58] Field of Search ................ 180/132; 137/355, 351; 417/199 A; 418/270; 220/82 R; 73/294, 323

[56] References Cited

U.S. PATENT DOCUMENTS

| 2,564,230 | 8/1951 | Pitney | 137/351 X |
| 2,633,002 | 3/1953 | Radus | 137/351 X |
| 2,755,629 | 7/1956 | Baisch | 73/323 X |
| 3,181,362 | 5/1965 | McKenney | 73/323 X |

FOREIGN PATENT DOCUMENTS 1028832  4/1958  Fed. Rep. of Germany ........ 73/323

Primary Examiner—John A. Pekar
Attorney, Agent, or Firm—Zalkind & Shuster

[57] ABSTRACT

The intake fitting of a vehicle engine driven pump mounted on the engine block is connected to one end of an elongated, flexible conduit section acting as a fluid storing reservoir. The other open end of the conduit remote from the pump is anchored at a location in the engine compartment of a vehicle above the pump and readily accessible for servicing and oil level monitoring. A removable cap closes the open end of the conduit section.

8 Claims, 1 Drawing Figure

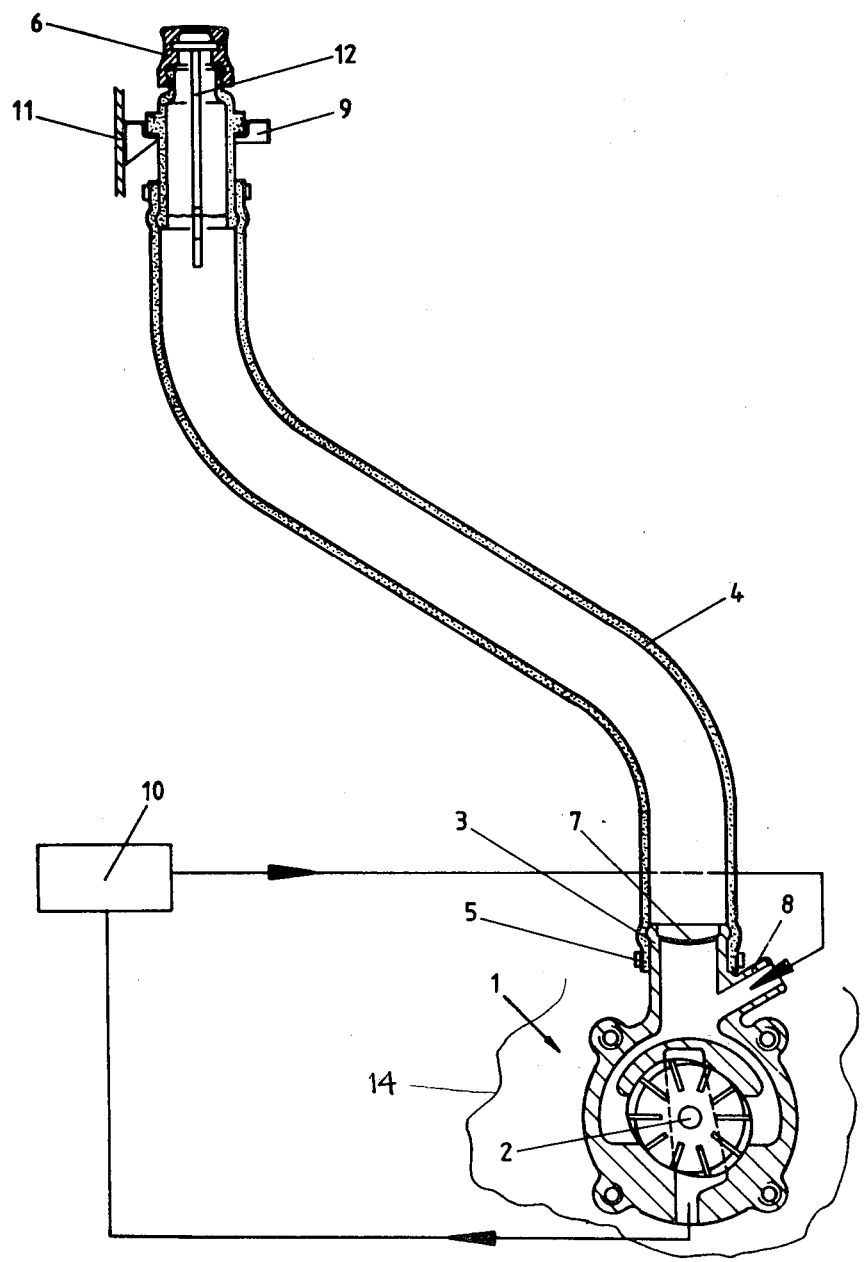

OIL RESERVOIR PARTICULARLY FOR HYDRAULIC STEERING SYSTEM

BACKGROUND OF THE INVENTION

This invention relates to hydraulic fluid reservoirs associated with high pressure pumps for fluid powered equipment such as fluid power steering mechanism.

Fluid reservoirs of the foregoing type are generally well known as disclosed, for example, in U.S. Pat. No. 3,273,503. The purpose of such reservoirs is to de-aerate the pressure fluid or oil circulating in hydraulic circuits and to compensate for changes in fluid volume as well as losses through leakage that occur as a result of heating. Such fluid reservoirs are generally made of sheet metal and are located directly within the high pressure pump supplying a hydraulic auxiliary power steering mechanism, for example. Oil reservoirs of such type have been formed together with the pump housing as a common casting, as disclosed, for example, in German Pat. No. 20 47 040. Because of the drive arrangement for the pump, however, it is not possible to so locate the pump on the vehicle engine so that the oil reservoir will be easily accessible for monitoring the oil level. As a result, the oil reservoir is placed at a higher location in the engine compartment and is connected with elongated hose lines to the high pressure pump and the auxiliary power steering mechanism.

It is therefore an important object of the present invention to provide an hydraulic fluid or oil reservoir that is easily accessible and yet capable of being produced in economic fashion regardless of the position of the high pressure pump with which it is associated.

SUMMARY OF THE INVENTION

In accordance with the present invention, a fluid reservoir for a hydraulic power system having a high pressure pump, is in the form of an elongated conduit attached to the pump and having a cover closing an end of the conduit remote from the pump. The pump may be provided with a special intake fitting to which the reservoir conduit is attached by a hose clamp. Further, the conduit may be in the form of a flexible hose made of transparent material in order to enable visual monitoring of oil level therein.

By use of a section of hose serving as the only reservoir for all the oil and positioned on top of the high pressure pump, a considerable saving in fabrication costs may be realized. Because of the flexibility and variable length of the hose, it may be so located with its oil intake opening within the engine compartment so as to render the oil reservoir easily accessible for servicing.

BRIEF DESCRIPTION OF THE DRAWING FIGURE

An embodiment of the invention is explained in greater detail hereinafter with reference to the accompanying drawing having a single FIGURE illustrating in cross section the improvement of the present invention in association with other components shown schematically.

DETAILED DESCRIPTION OF PREFERRED EMBODIMENT

Referring now to the drawing in detail, an installation is illustrated for a high pressure pump 1 of the vane type, for example, in an automotive vehicle having an engine and power vehicle controlling equipment such as a fluid power steering motor 10. The pump is driven by the vehicle engine through a drive shaft and supplies pressurized fluid such as oil to the steering motor 10. The engine block 14 mounts the pump.

In accordance with the present invention, elongated conduit 4, such as a section of flexible hose, acts as an oil reservoir and is coupled to an intake fitting 3 associated with the pump 1. The conduit 4 is firmly clamped to the fitting 3 by means of a hose clamp 5 and is closed at one end remote from the pump by a cover cap 6. The cap is removable so as to expose an accessible intake opening at the end of the conduit 4 through which the oil reservoir may be serviced. A filter strainer 7 is inserted into the intake fitting 3. The pressure fluid inflow from the steering motor 10 enters the intake fitting 3 through a return connection 8.

The conduit 4 acting as a fluid reservoir has the advantage of enabling the mounting of the high pressure pump 1 on the engine block at such location to accommodate only the requirements of its engine drive arrangement, such as a V-belt drive. The length of the conduit 4 and its location may be selected so as to render the conduit easily accessible for servicing as aforementioned. The upper end of the conduit 4 closed by cap 6 is anchored by means of a holding device 9 to the engine block or to the inside wall 11 of the vehicle fender. The cover cap 6 may be attached to an oil measuring stick 12 in order to monitor oil level in a hose made of opaque material, for example.

Alternatively, the conduit 4 may be made from a transparent plastic. In such case, the oil level may be visually monitored by means of markings applied to the conduit.

What is claimed is:

1. In an automotive vehicle having an engine compartment enclosing a fluid powered mechanism (10) to which pressurized fluid is supplied by a vehicle engine driven pump (1) having an intake fitting (3), and a fluid reservoir enclosing a required storage volume from which the fluid is exclusively withdrawn by the pump, the improvement residing in said fluid reservoir being formed by an elongated flexible hose (4) having opposite open ends between which said required storage volume of the fluid is confined, clamp means (5) connecting one of said ends of the hose to the intake fitting of the pump, means (9) fixedly anchoring the hose adjacent the other end thereof at an accessible location (11) above the pump within the engine compartment, and a removable cap (6) closing said other end of the hose adjacent said accessible location.

2. The combination of claim 1 wherein said hose is made of transparent material.

3. The combination of claim 2 wherein said accessible location is on a fender of the vehicle.

4. The combination of claim 1 wherein said accessible location is on a fender of the vehicle.

5. The combination of claim 1 including an engine block within the engine compartment on which the pump is mounted.

6. The combination of claim 5 wherein said accessible location is on a fender of the vehicle above the pump.

7. The combination of claim 5 wherein said accessible location is on the engine block (14) above the pump.

8. The combination of claim 1 including a level indicating element (12) attached to the cap and projecting therefrom into the hose.

* * * * *